(12) United States Patent
Carter et al.

(10) Patent No.: US 7,680,897 B1
(45) Date of Patent: Mar. 16, 2010

(54) METHODS AND SYSTEMS FOR MANAGING NETWORK TRAFFIC

(75) Inventors: Stephen R Carter, Spanish Fork, UT (US); Robert Drew Major, Orem, UT (US)

(73) Assignee: Novell, Inc., Provo, UT (US)

( * ) Notice: Subject to any disclaimer, the term of this patent is extended or adjusted under 35 U.S.C. 154(b) by 1161 days.

(21) Appl. No.: 10/409,529

(22) Filed: Apr. 8, 2003

(51) Int. Cl.
G06F 15/16 (2006.01)
G06F 15/173 (2006.01)

(52) U.S. Cl. .................. 709/217; 709/219; 709/226

(58) Field of Classification Search ............. 709/224, 709/217, 219, 226
See application file for complete search history.

(56) References Cited

U.S. PATENT DOCUMENTS

| | | | |
|---|---|---|---|
| 5,649,110 A | 7/1997 | Ben-Nun et al. | |
| 5,864,540 A | 1/1999 | Bonomi et al. | |
| 5,870,384 A | 2/1999 | Salovuori et al. | |
| 5,925,100 A * | 7/1999 | Drewry et al. | 709/219 |
| 5,926,459 A | 7/1999 | Lyles et al. | |
| 6,064,650 A | 5/2000 | Kappler et al. | |
| 6,064,651 A | 5/2000 | Rogers et al. | |
| 6,185,601 B1 | 2/2001 | Wolff | 709/203 |
| 6,310,881 B1 | 10/2001 | Zikan et al. | 370/401 |
| 6,327,622 B1 | 12/2001 | Jindal et al. | 709/228 |
| 6,484,143 B1 | 11/2002 | Swildens et al. | 705/1 |
| 6,499,088 B1 * | 12/2002 | Wexler et al. | 711/152 |
| 6,751,659 B1 * | 6/2004 | Fenger et al. | 709/223 |
| 6,868,439 B2 * | 3/2005 | Basu et al. | 709/213 |
| 2002/0103778 A1 * | 8/2002 | Saxena | 707/1 |
| 2002/0107743 A1 * | 8/2002 | Sagawa | 705/17 |
| 2003/0112817 A1 | 6/2003 | Woo et al. | |
| 2003/0135639 A1 * | 7/2003 | Marejka et al. | 709/232 |
| 2004/0064577 A1 * | 4/2004 | Dahlin et al. | 709/235 |
| 2005/0169173 A1 | 8/2005 | Mahdavi | |

OTHER PUBLICATIONS

"European Search Report", *Search Report received for EP Application No. 04106294*, (Mar. 2, 2005),4 pgs.
Floyd, Sally, "Link-sharing and Resource Management Models for Packet Networks", *IEEE/ACM Transactions of Networking, 3(4)*, (Aug. 1995),365-386.
Zhang, H. , et al., "Rate-controlled static-priority queueing", *Networking: Foundation for the Future, San Francisco, Mar. 28-Apr. 1, 1993, Proceedings of the Annual Joint Conference of the Computer Communications Societies (INFOCOM), Los Alamitos, IEEE Comp. Soc. Press, US, vol. 2, Conf. 12*, (Mar. 28, 1993),227-236.

* cited by examiner

*Primary Examiner*—John Follansbee
*Assistant Examiner*—Chirag R Patel
(74) *Attorney, Agent, or Firm*—Schwegman, Lundberg & Woessner, P.A.

(57) ABSTRACT

Methods and systems for network traffic management are provided. A content distribution network application manages data in a cache. A network rate shaper application controls and manages requests for access to an external network connection. The content distribution network application determines priorities associated with requests and communicates these priorities to the rate shaper application. The rate shaper application adjusts access levels or data transfer rates for the requests based on the received priorities.

37 Claims, 3 Drawing Sheets

METHODS AND SYSTEMS FOR MANAGING NETWORK TRAFFIC

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2003, Novell, Inc., All Rights Reserved.

FIELD OF THE INVENTION

The present invention relates to managing network traffic and in particular to managing an internal network's access to an external network connection.

BACKGROUND OF THE INVENTION

Managing network bandwidth is becoming increasingly challenging as resources, previously deployed, become inadequate for handling increased network traffic. Many issues have contributed to this unforeseen expansion in the use of network bandwidth. One of the issues is the ever-increasing use of digital media used for training and electronic learning. Accordingly, organizations have discovered that remote network meetings and/or training using multi-media content for a specific task is far less expensive to the organization than flying meeting coordinators and/or educational trainers to remote geographic locations.

Moreover, in the area of entertainment, many have found the convenience of selecting and viewing media from a desired location much more enticing than in engaging in a journey to a store, searching media inventory, checking a desired selection out, and returning to watch the media in the desired location. Further, the problem is rapidly escalating because of the increased use of networks to move sizable media files to remote viewing locations in time for desired events. Legacy network infrastructure is becoming taxed beyond its intended capacity, and the expense associated with deploying additional or new network resources is often prohibitive for organizations.

Conventionally, a number of software and hardware techniques have been used to assist with managing network traffic where limited network bandwidth is available to an organization. One technique is to use a cache that stores frequently accessed data, such that when some requests are received for external data the local cache is available to immediately provide the data. Under these circumstances, external network traffic is avoided altogether since the data is available locally in the cache to service a request. This is desirable because the Local Area Network (LAN) bandwidth is usually much higher (e.g., 100 Mega Bits/second) than the link to the external network connection (e.g., 128 Kilobits/second). Thus, once the local cache has the content and can serve the request locally, response times are decreased and customer satisfaction is increased.

Caching applications that manage a cache generally improve data delivery performance for subsequent requests after an initial first request. This is so because the cache does not have data to service a request until a first request is actually made for the desired data. Thus, caching techniques have been enhanced with more intelligent applications that assist in managing network traffic. These applications are embodied in Content Distribution Network (CDN) systems.

A CDN can perform a variety of intelligent routing and scheduling on network traffic in order to improve network performance. For example, a CDN application can determine that a certain type of data is frequently accessed over the network, such that when this data is removed from the cache or the cache is flushed, the CDN applications acquires the data and populates the cache with the data before an initial or first request is actually made for the desired data. Thus, by adding a CDN to network traffic management systems a first requester for desired data can obtain the same benefits that subsequent requesters enjoy by using traditional caching applications. In this way, CDN applications can perform operations to pre-position data in a cache in order to improve network traffic management.

However, because industries have desired modularity and independence of operation, many other applications that assist in managing network traffic are not integrated with caching applications and/or CDN applications. As a result, an external network connection can be unduly taxed by downloads being performed by a CDN application while other more important and immediate requests linger or slowly process waiting for increased access to the external connection. Since priority and policies are not communicated in an integrated fashion from the CDN and other applications that directly control access to the external network connection, adequate adjustments are not made to accommodate the higher priority requests. Additionally, other network traffic management policies are not adequately communicated between the CDN and the applications directly controlling access to the external network connection.

Thus, conventional techniques may be developed in a layered or modular fashion, but these techniques lack the ability to fully utilize an organization's external network connection and do not utilize the connection in an intelligent and efficient manner. Correspondingly, an organization may seek to adopt a more expensive hardware solution that increases a number of external network connections or upgrades the type of external network connection in the hopes of improving network traffic performance. Yet, an expensive hardware solution may not be necessary if an organization's caching, CDN, and external network connection applications were integrated and communicated effectively with one another.

As is now apparent to one of ordinary skill in the art, there exists a need for improved techniques that more effectively manage network traffic. This need is particularly desirable with large-scale networks, networks with heavy traffic, and/or networks processing large media files. Moreover, it is important for a network that has good internal connectivity and internal bandwidth but is limited to external access because of limitations of its external link.

SUMMARY OF THE INVENTION

In various embodiments of the present invention, techniques managing network traffic are described. A content distribution network application and a rate shaper application cooperate with one another to manage access to an external network connection in order to improve utilization, and in some instances, performance of the external network connection.

More specifically and in one embodiment of the present invention, a method to manage network traffic is presented. A cache application is used to manage network traffic. A content distribution network application is interfaced with the cache application to assist in managing the network traffic. Furthermore, a network rate shaper application is interfaced with the content distribution network application to prioritize the network traffic for the content distribution network application.

In another embodiment of the present invention, another method to manage network traffic is provided. Data that is frequently accessed over an external network connection is identified. The data is acquired in advance of a first request over the external network and pre-positioning in a cache. Moreover, an access rate, for acquiring the data over the external network connection in order to accommodate a second request having a higher priority to access the external network connection, is altered.

In still another embodiment of the present invention, a system to manage network traffic is described. The system includes a cache application, a content distribution network application, and a network rate shaper application. The cache application retains data in a cache, which is frequently accessed, in order to service a number of requests without accessing an external network connection. The content distribution network application identifies frequently accessed data missing from the cache and acquires the frequently accessed data in advance of one of the requests and communicates with the cache application to pre-position the frequently accessed data in the cache. The rate shaper application manages access to the external network connection and alters its management policies based on communication with the content distribution network application.

In yet another embodiment of the present invention, another network traffic management system is taught. The system includes an external network connection, an internal network, a content distribution network application, and a network rate shaper application. The content distribution network application manages, pre-acquires, and pre-positions data in a cache, where the data is associated with information that natively resides on an external network and is acquired via the external network connection. The rate shaper application controls access to the external network connection and alters access levels based in part on directives received from the content distribution network application.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

In various embodiments of the present invention, a Content Distribution Network (CDN) includes one or more applications that interact with one or more caching applications and network topology information in order to assist in moving data efficiently through a physical and logical network of computing resources.

In one embodiment of the present invention, a network rate shaper application interfaces with one or more CDN applications. Unlike conventional rate shaper applications that are primarily designed to prioritize network packets processing at a lower level of abstraction without determining any details about the content of a network packet, the rate shaper application of the present disclosure operates at a higher level of abstraction and is at least partially integrated with one or more CDN applications.

Thus, rate shaper applications in various embodiments of the present invention permit a CDN to directly affect the priority with which processing occur over an external network connection. Furthermore, in some embodiments of the present invention, the CDN system includes the rate shaper application and affects priority by controlling, scheduling, and prioritizing what is released by the CDN for processing by an external network connection. Thus, the rate shaper application can be independent or integrated into a single CDN application or system.

An external network connection is a physical and logical network interface or connection that links an internal network to an external network. Some example external network connections can include, but are not limited to, Asynchronous Transfer Mode (ATM) interfaces, Gigabit Ethernet (GigE) interfaces, Frame Relay (FR) interfaces, Time-Division Multiplexing (TDM) interfaces, Integrated Services Digital Network Interfaces (ISDN), and others. The external network connection also includes processing, memory, and application resources.

Generally, an external network connection will categorize certain types of network traffic and assign different ports or processing resources for defined types of network traffic. Thus, for example external Internet traffic (utilizing port 80) can be given 50% of available bandwidth, while the remaining bandwidth is allocated for other types of network traffic (e.g., external connections being made directly to the internal network, and others).

The rate shaper various embodiments of the present invention has access to or knows the network traffic allocations or policies associated with the external network connection and can be authorized to modify and issue commands to the external network connection to reallocate and prioritize processing and bandwidth allocated within the external network connection.

Furthermore, in one embodiment, the present disclosure is implemented within the Volera Content Distribution Network (VCDN) product offerings, distributed by Novell, Inc. Moreover, other products that assist in managing a cache can be used, such as other Novell products like Excelerator, Border Manager, iChain, and others. However, it is to be understood that the teachings of the present disclosure can be implemented in other existing products (e.g., existing routers, switches, hubs, servers, software, and other computer or network resources) and/or standalone products. All such modifications to existing products and/or custom-created products, which implement the teachings of the present disclosure, are intended to fall within the scope of the present disclosure.

Figure 1:
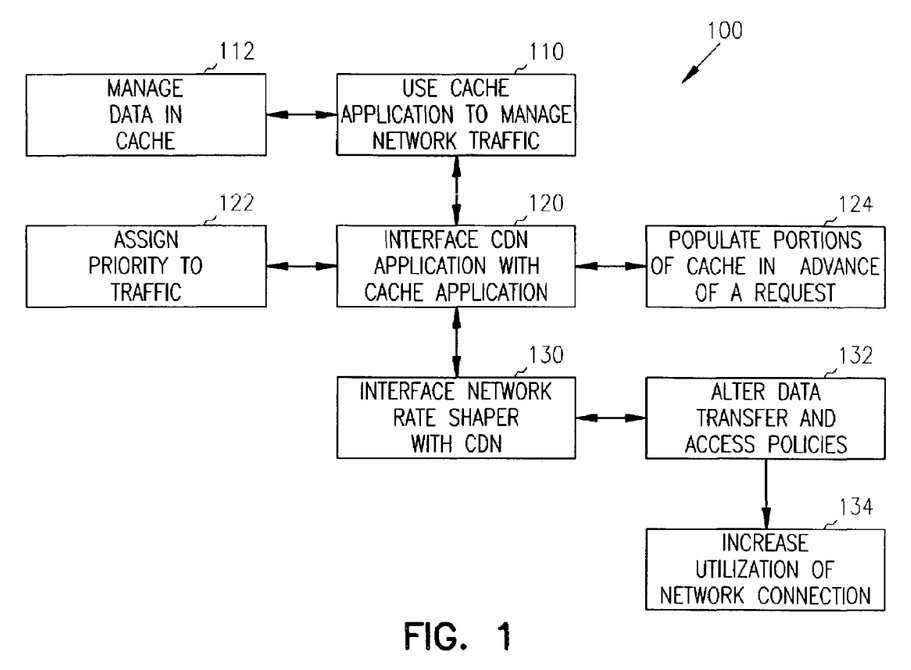
FIG. 1 is a flowchart representing a method to manage network traffic, according to one embodiment of the present invention.

FIG. 1 illustrates a flowchart of one method 100 used for managing network traffic, according to one embodiment of the present invention. The method can be implemented in one or more software applications, firmware modules, and/or hardware devices. The method's 100 processing is designed to manage network traffic occurring on an external network connection.

The external network connection is a network interface that links an internal network and one or more external networks. Further, the external network connection is embodied as one or more network physical interfaces (ATM, ISDN, FR, GigE, TDM, and the like) and/or one or more software applications that monitor, schedule, and/or prioritize access to the external network connection's resources (interface ports, processors, memory, applications, and the like).

At 110, a cache application is used to manage network traffic by managing a cache resource associated with the external network connection. The cache application can be any existing cache application or custom-developed application that is used with the teachings of the present invention. The cache application acquires data from the external resources when it receives an initial and first request from a requestor. The cache application then stores the data in the cache for subsequent retrieval when requested by subsequent requests, such that no external network connection is needed to acquire the data. The cache application can also include a variety of cache management functions, such as operations to update data in the cache, operations to move less accessed data or old data out of the cache, and operations to flush the cache of all entries. Accordingly, at 112 the cache application manages the data placed in the cache.

At 120, A CDN application is used to more intelligently manage network traffic and access to the external network connection. Thus, a variety of CDN functions may not submit requests for data residing on external resources to the external network connection until a desirable time is acquired for making the request. The CDN application can schedule requests and can make requests on its own, such as when the CDN application determines that certain types of data are advantageously acquired and pre-positioned in the cache before any first or initial request is actually made for the data, as depicted at 122. This can be achieved by the CDN application analyzing network traffic patterns and requests. Another mode of operation can be achieved by an administrator providing a list of content to the CDN application that is to be pre-positioned along with a schedule for performing the pre-positioning. Moreover, the CDN application can determine the type of request and type of data being requested in order to beneficially route the request to an appropriate or better suited external network connection servicing device.

The CDN application, at 124, is also capable of assigning priorities to requests that are made to a processing external network connection. Thus, when a CDN application is making a request on its own for data to pre-populate data in the cache in advance of any actual initial request, the CDN application can decide that this type of request is a batch request and thus is to be assigned a lower priority than other immediate requests being received by requestors that are external to the CDN application.

Priorities assigned by the CDN application can be determined by inspecting the data type (e.g., media data, file data, directory data, Hyper Text Transfer Protocol (HTTP) data, text data, email data and the like) and inspecting the type of request (e.g., CDN application initiated request, external requestor, external requestor associated with a priority, administrator provided list of content to be pre-positioned, and others) being made to access the external network connection. The CDN application can also access network traffic policies that include logic that determines in any given circumstance the priority of a particular request, based on a number of factors including time of day, requestor, type of data requested, current load of processing associated with the external network connection, and the like.

Once a priority is assigned to a request, this priority can be communicated to a rate shaper application at 130. In some embodiments, the rate shaper application is part of a CDN system or a sub-application of the CDN application. In other embodiments, the rate shaper application is a separate and distinct application that is in direct communication with applications and resources of the external network connection. Thus, the rate shaper application is capable of taking resources (or reallocating resources) away from one request on the external network connection and giving the freed resources to another request. Priorities are received from the CDN application.

In other embodiments, priorities are received independent from the CDN application from other sources or priorities are determined by the rate shaper application independent from the CDN application.

Since the CDN application is aware of the requests processing on the external network connection (e.g., those submitted and not yet confirmed completed, those in process, and those queued for processing), the CDN application can use the rate shaper application to force some requests to be restricted or reassigned to a limited number of processing, memory, or port resources. The freed external network connection resources (processing, memory, and ports) can also be reassigned by the CDN through communication with the rate shaper application.

Thus, at 132, a first processing request and a second subsequently received request can have their corresponding data transfer rates altered by directives of the CDN application to the rate shaper application. For example, suppose that the first processing request is a CDN batch request that is attempting to pre-populate the cache with data that should be in the cache but has not yet been requested by any requester. Suppose further that the second subsequent request is a request to hold a video conference between two executives of an organization. In this situation, under conventional circumstances, the video conference would be delayed until the first processing request completely downloaded the data needed to fulfill its request, or alternatively the video conference may be allowed to proceed but with a limited amount of external network bandwidth, since the first processing request has already acquired and is using the majority of bandwidth. With various embodiment of the present invention, this problem is solved because the CDN application provides the rate shaper application the video conference request with a higher priority than the processing batch request. In response to this, the rate shaper application directs resources of the external connection away from the batch request and re-assigns them to the video conference request. Thus, an organization's existing bandwidth is more appropriately prioritized and more efficiently allocated than what has been achievable in the past.

In a more complicated example, some resources of the external network connection may be reserved by policies of the external network connection owner such that only certain types of data or sizes of data are permit to access certain ports or resources of the external network connection. This is typically what is done in an attempt to manage limited resources of an external network connection. However, because this segmentation is done often a sizable amount of external network connection resources go unused or under utilized at times when other resources are being fully taxed. This situation may cause an organization to believe that additional external network connections are needed or that the organization needs to upgrade to a higher bandwidth external network connection. In fact, either solution chosen by the organization to address the problem is not optimal, since the existing network connection is not intelligently utilizing existing resources and bandwidth of its existing network connection.

With embodiments of the present invention, an external network connection's utilization is increased as depicted at 134. This is achieved by the CDN application having access to the policies of the external network connection indirectly through the rate shaper application or directly. With knowledge of these policies, data sizes and/or formats can be adjusted to conform to exiting policies such that all or most of the available resources or bandwidth of the external network connection are being fully utilized. In other embodiments, the rate shaper application may be authorized to suspend policies or change policies temporarily to ensure utilization on the external network connection is being maximized.

One of ordinary skill in the art now appreciates that the functionality of rate shaper applications can be integrated, interfaced, and married to a CDN application in order to more completely utilize resources of an external network connection. Moreover, this integration will not result in users experiencing any noticeable network traffic performance degradation when large object of less significance are being downloaded by another user or another application (e.g., such as when a CDN application is performing downloads to pre-populate and pre-position data in the cache). Further, when a user desires a large object it is probable that the object will already reside in the cache for immediate delivery without taxing the external network connection because of the intelligent actions of the CDN application.

Conventionally, external network connections and corresponding bandwidth resources are underutilized a majority of the time within an organization; the teachings of the present disclosure can correct this situation and permit utilization to approach full or maximum capacity. Therefore, organizations can improve network traffic efficiency and throughput without resorting to solutions that involve expensive and unnecessary hardware deployment.

Figure 2:
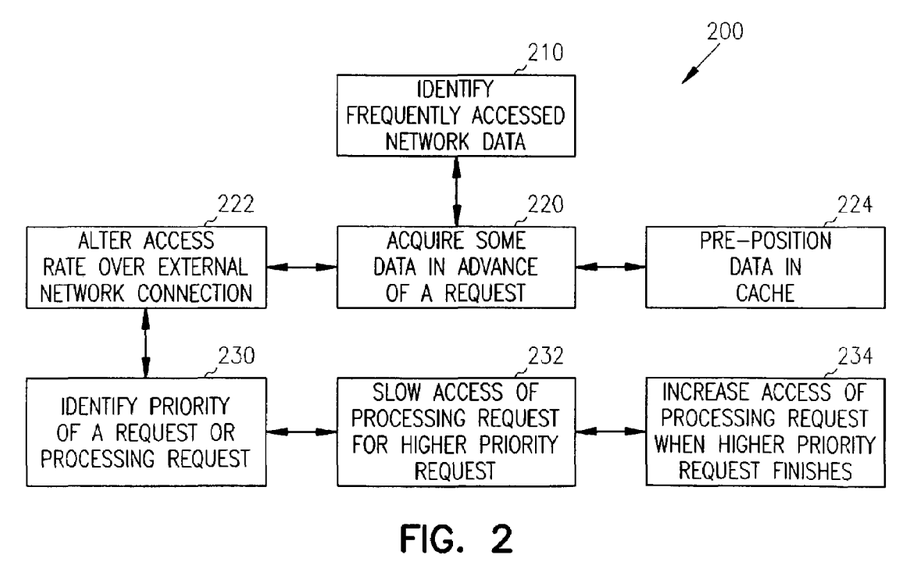
FIG. 2 is a flowchart representing another method to manage network traffic, according to one embodiment of the present invention.

FIG. 2 illustrates a flowchart representing another method 200 used to manage network traffic, according to one embodiment of the present invention. The method 200 is implemented in one or more software, hardware, and/or firmware modules within a computer-accessible medium. Method 200 manages network traffic occurring over an external network connection. An external network connection includes one or more network interfaces, software, processor, and/or memory resources that control data going out over an external network and data coming into an internal network from an external network.

At 210, data that is frequently accessed is identified. Frequently accessed data includes data that natively resides on an external network resource (e.g., external server, web site, data store, directory and the like). Software analysis of historical external access patterns can be used to automatically determine data that is frequently accessed from internal network requests.

In some instances, this frequently accessed data is maintained and available in a cache by one or more caching applications. However, in some circumstances such as when the cache becomes full before a request is received for the data, or such as when the cache is initialized or flushed, the desired data may not be available in the cache. Under these circumstances, at 220, the frequently accessed data can be automatically acquired and pre-positioned, at 224, in the cache before any first or initial request is actually made for the data. In some embodiments, this intelligent pre-acquisition of frequently accessed data can be achieved with a CDN application interfaced to one or more cache managing applications.

At 222, the resources (e.g., memory, processing percentage, and available ports) associated with the external network connection can also be altered to account for priorities of requests to access the external network connection. For example, if a CDN application has a first request that is processing on a number of the resources of the external network connection in order to pre-acquire and pre-position data in a cache in advance of an initial request that desires the data, and a second request is received to access the external network connection, then resource allocations of the external network connection can be altered or re-adjusted to accommodate the proper priorities of the requests. Thus, the first request may be considered a lower request or a request of the CDN application, while the second request can originate from an end-user having an immediate need for some data accessible through the external network connection. In this situation, resources (ports, memory, and processing) can be taken from the processing first request and reallocated to the second, higher priority request.

Thus, at 230, requests for access to the external network connection can be associated with priorities. The priorities can be evaluated during processing or can be evaluated before processing if necessary. Thus, any existing processing request can be slowed at 232 when a higher priority request is detected. By slowing, resources that are normally available to a processing request are circumscribed or limited for processing requests when higher priority requests are detected. Accordingly, at 234, access can be increased for a previously slowed request by making more of an external network connection's resources (ports, processing, and memory) available when the higher priority request finishes by returning these resources to the previously slowed request. Access or bandwidth can be more fully utilized and prioritized by properly administering and monitoring resources associated with the external network connection.

In some embodiments, the actual external network connection resource monitoring and administrating application is handled by a rate shaper application interfaced to a CDN application. In other embodiments, the CDN application attempts to intelligently distribute and schedule requests for the external network connection without interfacing with any rate shaper application. In still more embodiments, a CDN system or application includes a rate shaper application.

Resources need not always be reallocated, in some instances resources are optimally used to achieve maximum bandwidth within an external network connection. For example, consider a CDN application referred to as a CDN Content Scheduler (CS), which interfaces and cooperates with a Network Rate Shaper (NTRS) application. During cooperation, the NTRS sends messages to the CS telling it what content characterization is most acceptable at that particular time for high priority, medium priority, and low priority. The level of detail/granularity associated with priorities can vary and can be significantly more detailed, three levels of high, medium, and low are presented for purposes of illustration only. The CS responds by requesting (pull model) or sending (push model) content characterization of the highest priority that is currently scheduled to be pre-positioned in the cache. If more bandwidth (ports, processing, and memory) is available the process can be repeated until the NTRS is managing bandwidth maximally. Moreover, the CS can actually interface with multiple NTRSs, such as when multiple external network connections are deployed. Further, there can be multiple CSs for multiple NTRSs, a single CS for multiple NTRSs, and multiple CSs for a single NTRS.

In another example embodiment, predictive operation of the CS in relation to the NTRS can be implemented. With predictive operation, each CS interacts with each NTRS by pushing or pulling the highest priority content characterization to be pre-positioned in the cache. The priority that the NTRS assigns the data content or request is noted. When the content is finished being pre-positioned (or before if the CS determines that more traffic will not be detrimental) a different priority content characterization is pre-positioned in the cache, and the priority that the NTRS assigns the content is noted and compared to the earlier priority. This process is repeated until the CS finds the highest priority that the NTRS will assign to content characterization. Moreover, at integral times during the day (e.g., hourly, or any configurable period) a check is made around the current best content characterization to see if the NTRS has changed policy and will now give a higher priority to a new content characterization. If this is the case, then the CS acquires the new highest priority and pre-populates the cache with content that reflects this new highest priority.

Thus, the embodiments of the present invention can be used to alter and reallocate resources associated with an external network connection or can be used to more fully utilize under used resources so that the resources of an external network connection are maximally used. Furthermore, the resource allocation is directly related to bandwidth throughput/utilization associated with the external network connection.

Figure 3:
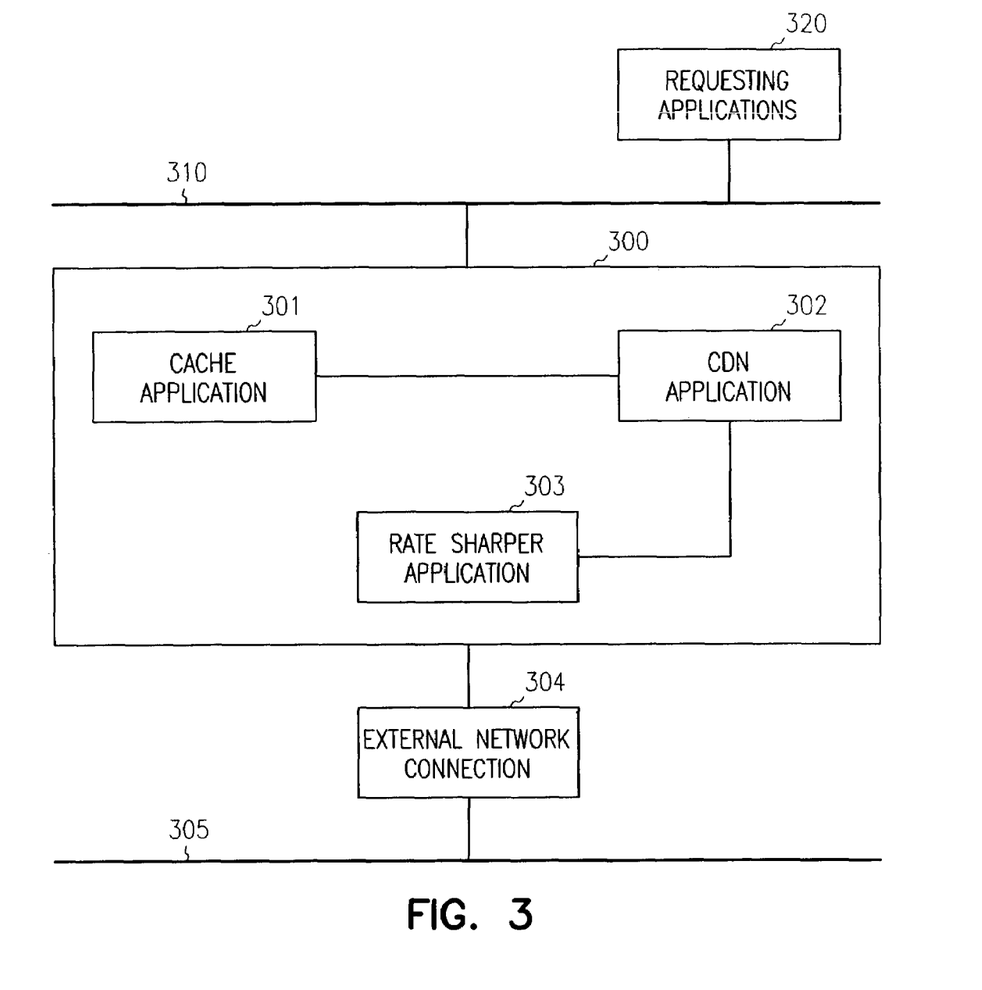
FIG. 3 is a diagram of a system to manage network traffic, according to one embodiment of the present invention.

FIG. 3 illustrates a diagram of one system 300 to manage network traffic, according to one embodiment of the present invention. The system 300 includes a cache application 301, a Content Distribution Network (CDN) application 302, and a rate shaper application 303. The system 300 is implemented in a distributed environment and the various components need not reside on the same computer or network processing devices, rather, the components can reside on disparate devices and cooperate and interface with one another to achieve the teachings of various embodiments of the present invention.

The system 300 manages network traffic associated with an external network connection 304. The external network connection 304 includes both hardware and software associated with providing access to an external network 305 from an internal network 310. Thus, the external network connection can include interfaces associated with ATM, GigE, FR, TDM, ISDN, and others. Moreover, although a single system 300 is shown in FIG. 3 managing a single network connection 304, this need not be the case for all embodiments of the present invention, since multiple systems 300 can be used to manage a single external network connection 304, a single system 300 can be used to manage multiple external network connections 304, and multiple systems 300 can be used to manage multiple external network connections 304.

The cache application 301 retains data in a cache. The data stored in the cache represents data that is frequently accessed in order to service requests without accessing or using the external network connection 304. The frequently accessed data natively resides on resources in communication with the external network 305, and is stored locally in the cache for access by requesting applications 320 over the internal network 310.

The CDN application 302 identifies, among other things, data that is frequently accessed but missing from the cache for a variety of reasons, such as cache flushing, lack of recent access, and the like. The CDN application 302 issues its own requests to the external network connection 304 in order to access the external network 305 and acquire the missing data and pre-populate and pre-position the data in the cache in advance of a request from one of the requesting applications 302.

The rate shaper 303 application manages access to the external network connection 304 and alters management policies based on communications with the CDN application 302. The CDN application 320 filters and manages requests received from the requesting applications 320 over the internal network 310. The CDN application 302 determines priorities associated with the requests and is operable to issue its own requests to the rate shaper application 303 for requests that are associated with the CDN application 302 accessing the external network connection 304 for purposes of acquiring frequently accessed data for the cache in advance of an actual request for the data. Many self-initiated requests made by the CDN application 302 can be classified as lower priority requests by the rate shaper application 303, such that when a higher priority request is received from the CDN application 303, the lower priority requests that are processing in the external network connection 304 are adjusted to have access to less resources (ports, processing, and memory) and the higher priority request is given the freed up resources.

In still other embodiments, the CDN application 302 and rate shaper application 303 cooperate and interface with one another to ensure that resources of the external network connection 304 are being fully utilized at capacity. Thus, policies can be adjusted or data modified to conform to existing policies so that the resources of the external network connection 304 are fully utilized and at or near full capacity. In this way, the maximum bandwidth associated with the external network connection 304 can be achieved with various embodiments of the present invention.

Conventionally, maximum bandwidth would only be available in a near perfect circumstance (which would almost never occur) where all processing data has the right characteristics and conforms to the correct policies and are all simultaneously available on the external network connection 304. With embodiments of the present invention because of the cooperation between the CDN application 302 and the rate shaper application 303 maximum bandwidth utilization can be realized whenever sufficient data to maximize the external network connection 304 is being processed, since the CDN application 302 cooperates with the rate shaper application to ensure data is processed in order to maximally use the external network connection's resources.

Figure 4:
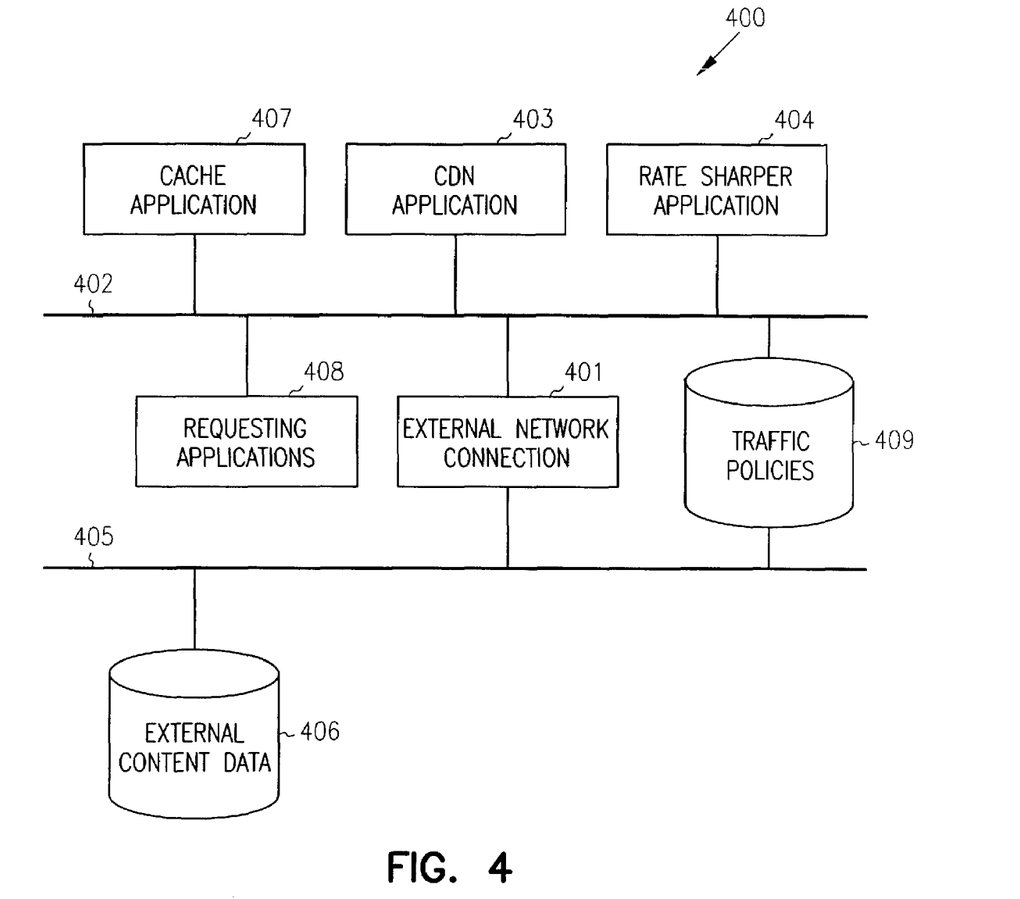
FIG. 4 is a diagram of another system to manage network traffic, according to one embodiment of the present invention.

FIG. 4 illustrates a diagram of another system 400 to manage network traffic, according to one embodiment of the present invention. The system 400 includes an external network connection 401, an internal network 402, a CDN application 403, and a rate shaper application 404. The system 400 is implemented in software, hardware, and/or firmware on a variety of computer and network resources, including in some instances the external network connection 401.

The external network connection 401 can be viewed as hardware (one or more devices) and software resources that manage and permit network traffic to flow between the internal network 402 and the external network 405. Thus, the external network connection can include network interface devices for ATM, GigE, FR, TDM, ISDN, and others. Each of the network interfaces also include ports, processing, and memory capabilities. The number of ports, types of ports, and processing determine a bandwidth capacity for the external network connection 401. Conventionally, specific ports or processing are reserved for specific data types or requests.

External content data 406 residing on resources accessible to the external network 405 provide data that satisfies requests received from requesting applications 408. Some of the data is stored in a cache that is managed by one or more cache applications 407. A variety of techniques can be used to manage the cache, such as first-in first-out (FIFO), techniques that retains data that has been more frequently accessed regardless of whether the data was first-in or not, or custom-developed techniques based on cache policies. However, in some instances, the cache can be flushed or data can be removed from the cache by the cache application 407. In these instances, the CDN application 403 can assist in re-acquiring data from the external content data 406 over the external network 405 by issuing requests for access through the external network connection 401. Thus, some data that is frequently accessed which is removed from the cache by the caching application 407 can be re-acquired, pre-populated, and pre-positioned in the cache through independent action of the CDN application 403.

The rate shaper application 404 controls access to the external network connection 401 and can alter access levels based in part on directives received from the CDN application 403. In some embodiments, the rate shaper application 404 has access to traffic policies 409 residing in electronic files or data stores. The traffic policies 409 can provide segmentation of the external network connection's resource 401 based on where requests are originated over the internal network, the types of requesting applications 408, and/or the data content characterization that satisfies a request.

A number of the traffic policies 409 are available to the rate shaper application 404. The rate shaper application 404 interfaces with the CDN application 403. Moreover, the CDN application 403 receives requests from the requesting applications 408. The CDN application 403 then initiates the content transfer associated with the requests through external network connection 401. Further, the CDN application 403 interacts and interfaces with the rate shaper application 404 to lower and/or raise priorities associated with the requests processing or issued to the external network connection 401. The CDN application 403 can also interacts and interfaces with the cache application 407.

Accordingly, the CDN application 403 identifies to the rate shaper application 404 accesses (requests) that are associated with CDN initiated batch processes (for acquiring data in advance of a request and others) and can direct the rate shaper application to identify and treat these batch processes as low priority requests. The CDN application 403 can also identify requests received from the requesting applications 408 with varying degrees of priority for processing by the rate shaper application 404.

Furthermore, in some embodiments, the CDN application 403 is capable of receiving some of the traffic policies 409 from the rate shaper application 404 and capable of modifying requests to conform to the policies 409 in order to fully utilize resources of the external network connection 401. In other embodiments, the CDN application 403 uses knowledge about the traffic policies 409 to make directives to the rate shaper application 404 for the purposes of altering or temporarily suspending a number of the policies 409, in order to fully utilize the resources and bandwidth associated with the external network connection 401.

It is now apparent, how a CDN application 403 can be altered to interface with and integrate to a cache application 407 and a rate shaper application 404. This integration of three applications that have conventionally been layered and independent of one another, permits organizations to more effectively manage network traffic and utilize external network connections 401 to full or maximum capacity. Thus, requests can be prioritized, altered, and/or scheduled to fully and more appropriately use an external network connections's 401 resources, This intelligent prioritization, alteration, and scheduling is not conventionally achievable because of the independent and layered nature of applications used to manage network traffic occurring on an external network connection.

Accordingly, organizations can now use the teaching of various embodiments of the present invention to implement software solutions that more completely maximize and utilize existing network bandwidth without having to purchase additional hardware resources (e.g., higher bandwidth external network connections) to solve network traffic throughput and utilization problems.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A computer-implemented method residing in a computer medium and processed by a computer to manage network traffic, comprising:

using, by the computer, a cache application to manage network traffic;

interfacing, by the computer, a content distribution network application with the cache application to assist in managing the network traffic, the content distribution network application analyzes patterns associated with the network traffic and analyzes requests for that network traffic to determine that certain types of data are to be acquired and pre-positioned in the cache before any first request is made for those types of data, the content distribution network application makes this determination based on a type of request and a type of data being requested with the requests, and at least some data is pre-positioned in response to a list provided from an administrator to the content distribution network application indicating that the data identified in the list is to be pre-positioned in the cache in accordance with a schedule that accompanies the list, and the types of data include media data, file data, Hypertext Transfer Protocol (HTTP) data, email data, and text data and the requests include a batch request, an external requestor request, and an external requestor request with a priority assigned already; and interfacing, by the computer, a network rate shaper application with the content distribution network application to prioritize the network traffic for the content distribution network application, and the content distribution network application alters at least some priorities of the network traffic via interactions with the network rate shaper and in response the network rate shape reallocate resources that handles the network traffic, and the content distribution network application includes and is integrated with the network rate shaper application, and the priorities are also altered in response to existing policies associated with an external network connection that handles the network traffic, and content distribution network application accesses the existing policies, which include logic that determines in any given circumstance a particular priority for a particular request, to alter at least some of the priorities for the network traffic, the existing policies include factors for time of day for the network traffic, requestor of the network traffic, type of data being requested with the network traffic, and current processing load associated with the external network connection, the network rate shaper application knows allocations for the network traffic and external network connection policies and the network rate shaper application issues commands to the external network connection to reallocate and prioritize processing and bandwidth allocated within the external network connection, the external network connection links an internal network with one or more external networks, the rate shaper application is separate and distinct from the content distribution network application and is in direct communication with external network application and external network resources of the external network connection.

2. The method of claim 1 wherein in using the cache application, the cache application manages data in a cache that is made available to satisfy a network request without accessing an external network.

3. The method of claim 1 wherein in interfacing the content distribution network application, the content distribution network application, acquires data to populate a cache for the cache application in advance of a request made for the data.

4. The method of claim 3 wherein in interfacing the network rate shaper application, the content distribution network application directs the rate shaper application to decrease a data transfer rate associated with acquiring the data when an additional request for additional data is determined to have a higher priority.

5. The method of claim 4 wherein in interfacing the network rate shaper application, the content distribution network application directs the rate shaper application to increase the data transfer rate for the data when the data having a higher priority is finished processing.

6. The method of claim 1 wherein in interfacing the network rate shaper application, the content distribution network application alters data transfer and accesses the policies of the rate shaper application in order to prioritize the network traffic.

7. The method of claim 1 further comprising, receiving, by the computer, requests associated with the network traffic for access to an external network connection, wherein the requests are managed by the cache application, the content distribution network application, and the network rate shaper application.

8. The method of claim 1 further comprising, increasing, by the computer, an access throughput to an external network connection through the cooperation of the cache application, the content distribution network application, and the network rate shaper application.

9. A computer-implemented method residing in a computer medium and processed by a computer to manage network traffic, comprising:
identifying, by the computer, data frequently accessed over an external network connection, the data associated with media data, file data, Hypertext Transfer Protocol (HTTP) data, email data, and text data;
acquiring, by the computer, the data in advance of a first request over the external network and pre-positioning the data in a cache and at least some additional data is acquired in advance and in response to a list provided from an administrator indicating that the additional data identified in the list is to be pre-positioned in the cache in accordance with a schedule that accompanies the list, and;
altering, by the computer, an access rate of acquiring the data over the external network connection during the processing associated with acquiring the data in order to accommodate a second request having a higher priority to access the external network connection by reallocating resources associated with the external network connection, and allocation of the resources is directly related to bandwidth throughput/utilization associated with the external network connection, and altering the access rate also accounts for existing policies associated with the external network connection, the existing policies include factors for time of day for network traffic, requestors of the network traffic, type of data being requested with the network traffic, and current processing load associated with the external network connection.

10. The method of claim 9 wherein in identifying, the data is identified by determining that historical high frequency network traffic, which has occurred over the external network connection, is associated with the data.

11. The method of claim 9 wherein in acquiring a content distribution network application determines that the data is to be acquired in advance.

12. The method of claim 9 wherein in altering a content distribution network application assigns the higher priority to the second request.

13. The method of claim 12 wherein in altering, the content distribution network application directs a rate shaper application to decrease the access rate of acquiring the data and to increase a second access rate for the second request.

14. The method of claim 12 wherein in altering, the content distribution network application directs a rate shaper application to increase the access rate of acquiring the data when the second request is finished.

15. A network traffic management system, comprising:
an external network connection that is maintained via one or more hardware devices having software resources;
an internal network that is maintained via one or more other hardware devices with other software resources;
a content distribution network application implemented in a computer medium and to process on a computer and that manages, pre-acquires, and pre-positions data in a cache, the data is associated with information that natively resides on an external network and acquired via the external network connection, and the content distribution network application is to analyze patterns associated with network traffic and analyze requests for that network traffic to determine the data and pre-positioned the data in the cache before any first or initial request is made for that data and at least some data is also pre-positioned in response to a list provided from an administrator to the content distribution network application indicating that the data identified in the list is to be pre-positioned in the cache in accordance with a schedule that accompanies the list, and;
rate shaper application implemented in a computer medium and to process on the computer and that controls access from the internal network connection to the external network connection and alters access levels and existing policies based in part on directives received from the content distribution network application, and the content distribution network application is to also alter at least some priorities of the network traffic via interactions with the rate shaper application and in response the rate shape application reallocate resources that handles the network traffic, and the content distribution network application includes the rate shaper application and is integrated with the rate shaper application, and the rate shaper application also alters the priorities in response to the existing policies associated with the external network connection, and the existing policies include factors for time of day for the network traffic, requestor of the network traffic, type of data being requested with the network traffic, and current processing load associated with the external network connection, the content distribution network application and the rate shaper application cooperate and interface with one another to ensure the software resources of the external network connection are being fully utilized at capacity.

16. The system of claim 15, wherein the external connection is a network interface including at least one of an Asynchronous Transfer Mode (ATM) interface, Gigabit Ethernet (GigE) interface, Frame Relay (FR) interface, Time-Division Multiplexing (TDM) interface, and Integrates Services Digital Network Interface (ISDN).

17. The system of claim 15, wherein the content distribution network application communicates with a cache application in managing the cache.

18. The system of claim 15, wherein the content distribution network application identifies to the rate shaper application accesses associated with request processing, which are considered to be low priority accesses.

19. The system of claim 18, wherein the request accesses are associated with acquiring some of the data over the external connection in advance of having received a request for the data.

20. The system of claim 15, wherein the rate shaper application controls access at least in part based on network traffic policies associated with the external connection.

21. The system of claim 20, wherein the network traffic policies are known to the content distribution network application and used by the content distribution network application in order to issue the directives to the rate shaper application.

22. The system of claim 20, wherein the network traffic policies are temporarily suspended or altered based on a number of the directives received from the content distribution network application.

23. A computer-implemented method residing in a computer medium and processed on a computer for managing network traffic, comprising:

processing, by the computer, a content distribution network (CDN) application for assisting with the management of network traffic, and the CDN application analyzes patterns associated with network traffic and analyzes requests for that network traffic to determine data and pre-positioned the data in the cache before any first or initial request is made for that data and wherein at least some data is pre-positioned in response to a list provided from an administrator to the content distribution network application indicating that the data identified in the list is to be pre-positioned in the cache in accordance with a schedule that accompanies the list, and;

interfacing, by the computer, a network rate shaper application with the CDN application to prioritize the network traffic, and the CDN application alters at least some priorities of the network traffic via interactions with the network rate shaper application and in response the network rate shape application reallocates resources that handles the network traffic, and the CDN application includes the rate shaper application and is integrated with the rate shaper application, and the network rate shaper application also prioritizes the network traffic in response to existing policies associated with an external network connection that handles the network traffic, and the existing policies include factors for time of day for the network traffic, requestor of the network traffic, type of data being requested with the network traffic, and current processing load associated with the external network connection, the network rate shaper application cooperate and interface with one another to ensure that the resources of the external network connection are being fully utilized at capacity.

24. The method of claim 23 wherein interfacing the network rate shaper application further includes directing, by the CDN application, the network rate shaper application to decrease or increase data transfer rates based on priorities of received requests associated with the network traffic.

25. The method of claim 23 wherein interfacing the network rate shaper further includes altering, by the CDN application, at least one of data transfer rate policies and access policies associated with portions of the network traffic, wherein the data transfer rate and access policies are controlled by the network rate shaper application.

26. The method of claim 23 further comprising inspecting, by the CDN application via the computer, data types and types of requests associated with portions of the network traffic in order to adjust priorities of the network traffic.

27. The method of claim 23 further comprising, reallocating, by the network rate shaper application via the computer, resources associated with the network traffic based on directives issued by the CDN application.

28. A computer-implemented method residing in a computer medium and processed by a computer to manage network traffic, comprising:

inspecting, by a content distribution network (CDN) application via the computer, requests associated with an external network connection, and the inspection includes determining the types of data associated with the requests, and the types of data include media data, file data, Hypertext Transfer Protocol (HTTP) data, email data, and text data; and directing, by the CDN application via the computer, a rate shaper application to adjust priorities and reallocate resources of the external network connection for network traffic associated with the requests based on the inspection performed by the CDN application, and the CDN application includes the rate shaper application and is integrated with the rate shaper application, and the rate shaper application also adjusts the priorities in response to existing policies associated with the external network connection, and the existing policies include factors for time of day for the network traffic, requestor of the network traffic, type of data being requested with the network traffic, and current processing load associated with the external network connection, and the rate shaper application is authorized to suspend the existing policies to ensure utilization on the external network connection is being maximized, and the rate shaper application forces some of the requests to be reassigned to a limited number of processing, memory, or port resources to ensure the utilization and in a manner that is contrary to the existing policies, the CDN application and the rate shaper application cooperate with one another to ensure that resources of the external network connection are being fully utilized at capacity.

29. The method of claim 28 wherein inspecting further includes, determining, by the CDN application, which of the requests have been submitted to the rate shaper application for processing, which of the requests have not yet been confirmed by the rate shaper application for processing, which of the requests that the rate shaper is currently processing, and which of the requests that the rate shaper has queued for subsequent processing.

30. The method of claim 28 wherein directing further includes, lowering, by the CDN application, a number of the priorities for some of the requests which are using a number of the resources associated with an external network connection where those requests are not actively communicating via the external network connection.

31. The method of claim 30 further comprising, reallocating, by the rate shaper application via the computer, a number of the resources associated with the external network connection to different ones of the requests which are actively attempting to communicate via the external network connection.

32. The method of claim 30 wherein directing further includes, adjusting, by the CDN application, the priorities in order to utilize a number of the resources which are being underutilized for purposes of increasing bandwidth associated with an external network connection.

33. A computer-implemented network traffic management system, comprising:
 a content distribution network (CDN) application implemented in a computer medium and processed on a computer; and
 a rate shaper application implemented in a computer medium and processed on the computer, the CDN application inspects requests associated with network traffic and priorities which are managed by the rate shaper application, and the CDN application adjusts the priorities in order to manage bandwidth to an external network connection, and the CDN application interacts with the rate shaper application to have the rate shaper application reallocate resources associated with the external network connection, and the CDN application includes the rate shaper application and is integrated with the rate shaper application, and the rate shaper application also adjusts the priorities in response to existing policies associated with the external network connection, and the existing policies include factors for time of day for the network traffic, requestor of the network traffic, type of data being requested with the network traffic, and current processing load associated with the external network connection, and the rate shaper application is authorized to suspend the existing policies to ensure utilization on the external network connection is being maximized, and the rate shaper application forces some of the requests to be reassigned to a limited number of processing, memory, or port resources to ensure the utilization and in a manner that is contrary to the existing policies, and the CDN application and the rate shaper application cooperate with one another to ensure that the resources of the external network connection and being fully utilized at full capacity.

34. The network traffic management system of claim 33 wherein the CDN application inspects data types associated with the requests to determine whether a number of the priorities need adjusting within the rate shaper application.

35. The network traffic management system of claim 33 wherein the CDN application inspects resources associated with the external network connection and adjusts a number of the priorities in the rate shaper application to increase utilization of those resources.

36. The network traffic management system of claim 33 wherein the CDN application adjust access policies for a number of the requests within the rate shaper application.

37. The network traffic management system of claim 33 wherein the CDN application temporarily suspends a number of traffic policies within the rate shaper to increase the bandwidth to the external network connection.

* * * * *